May 20, 1952 G. MATTUCCI 2,597,658

COLOR CORRECTION GAUGE

Filed July 8, 1950 2 SHEETS—SHEET 1

INVENTOR.
GUIDO MATTUCCI
BY
[signature]
ATTORNEY

May 20, 1952 G. MATTUCCI 2,597,658

COLOR CORRECTION GAUGE

Filed July 8, 1950 2 SHEETS—SHEET 2

INVENTOR.
GUIDO MATTUCCI

BY

ATTORNEY.

Patented May 20, 1952 2,597,658

UNITED STATES PATENT OFFICE 2,597,658

COLOR CORRECTION GAUGE

Guido Mattucci, New York, N. Y.

Application July 8, 1950, Serial No. 172,771

3 Claims. (Cl. 35—28.3)

The present invention relates to a color gauge which may be employed as a comparative guide in retouching photographic plates or films in connection with color printing operations and especially in connection with photoengraving processes.

In three color printing processes, blue, red and yellow, color separation negatives are made by the medium of color filters. In four color processes a black or brown separation negative is also made. These negatives, which are black and white, or grey, are retouched, black and white positives are made therefrom, which are further retouched or corrected if necessary and are used for making the corresponding printing plates.

One object of the present invention is to provide a color gauge, which is adapted to compose colors of any selective variety, value and intensity and which can be operated to translate the composed colors into corresponding grey representations, to serve as a comparative guide for retouching either the positives or negatives for use in color printing processes.

Various other objects of the invention are apparent from the following particular description and from an inspection of the accompanying drawings in which:

Fig. 1 is a front face view of the color gauge embodying the present invention;

Figs. 2, 3 and 4 are sections of the color gauge taken on lines 2—2, 3—3 and 4—4 of Fig. 1 respectively;

Fig. 5 is a rear view of the color gauge shown with the rear cover panel of its housing removed;

Figs. 6 and 7 are sections of the color gauge taken on lines 6—6 and 7—7 respectively of Fig. 1;

Figures 1, 2, 3, 4, 5:
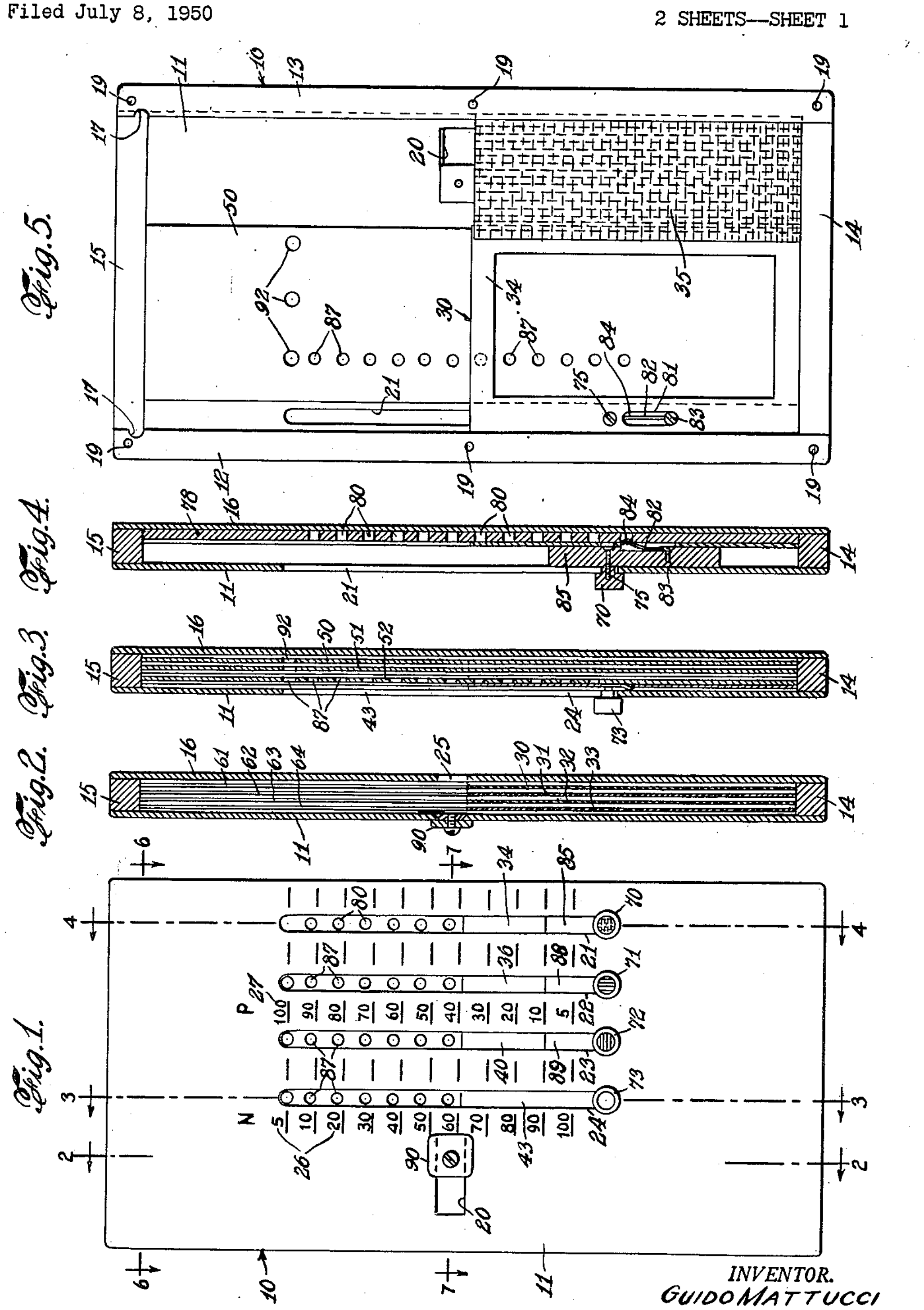
Figure 6:
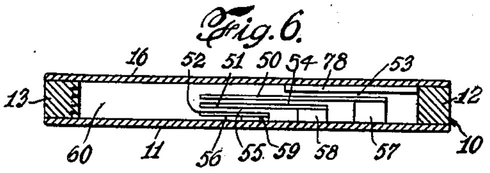
Figure 7:
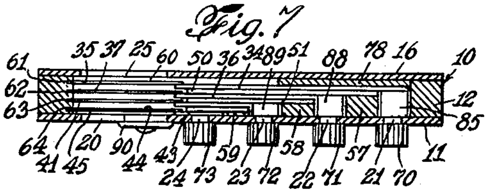

Referring to the drawings, the color gauge of the present invention comprises a frame or housing 10 including a front panel 11, side walls 12 and 13, a bottom wall 14, a top wall 15 and a rear removable panel 16. The front panel 11, side walls 12 and 13 and bottom wall 14 constitute one unit by forming them into an integral construction or by securing them together, while the rear panel 16 and the top wall 15 may constitute a separate removable unit. The side walls 12 and 13 have keying notches 17 and the top wall 15 has end tongues (not shown) of corresponding shape for retention in said notches. Screws (not shown) threaded into holes 19 in the side walls 12 and 13 serve to removably mount the rear panel 16 in position.

The front panel 11 has a window opening 20 and four parallel guide slots 21, 22, 23 and 24 on one side thereof serving for the purpose to be described, and the rear panel 16 has an opening 25 behind the window opening of corresponding size and shape to permit light to pass through said opening 25 and through a transparent colored film or films to be described displayed through said window opening. Index means in the form of a number scale 27 under the heading P increasing in denominations progressively upwardly and representing color gradations for the original image and also for the positive color separation films or plates is located between the slots 22 and 23, and a similar number scale 26 under the heading N increasing in denomination in the reverse direction and representing gradations for the negative color separation films or plates is located along one side of the slot 24.

Figure 8:
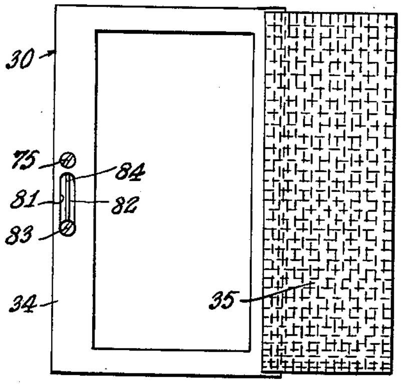
Fig. 8 is a face view of the yellow color slide constituting part of the gauge.

Inside the housing 10 are four slides 30, 31, 32 and 33. The slide 30 (Fig. 8) comprises a frame 34 of open rectangular shape and desirably of metal. Attached to one side of the frame 34 is a film 35 of suitably thin transparent or light pervious material colored to correspond to one of the separation colors. In the specific form shown, this film 35 is yellow in color and the intensity of its shading increases gradually downwardly, so that the lighter yellow is at the top.

Figure 9:
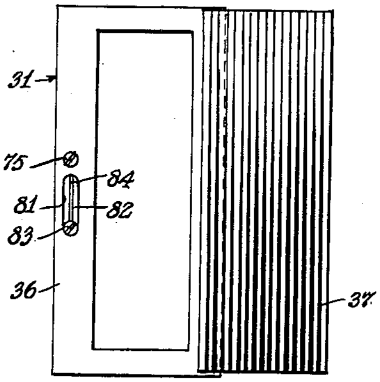
Fig. 9 is a face view of the red color slide constituting part of the gauge.

The slide 31 (Fig. 9) comprises a frame 36 of open rectangular shape and desirably of metal, smaller in width than the slide frame 34, but of substantially the same height. Attached to this frame 36 is a film 37 of suitable thin transparent or light pervious material colored, as for example red, to correspond to another of the separation colors. The color intensity or shading of the film 37 increases gradually downwardly, so that the lighter red is at the top.

Figure 10:
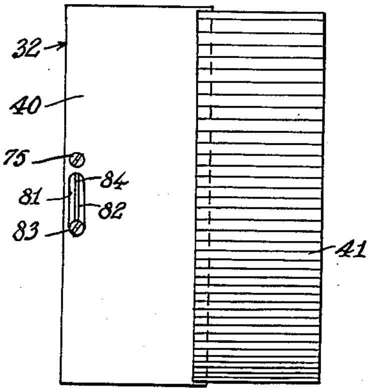
Fig. 10 is a face view of the blue color slide constituting part of the gauge.

The slide 32 (Fig. 10) comprises a frame 40, shown in the form of a solid rectangular metal sheet, smaller in width than the slide frame 36, but of substantially the same height. Attached to the side of this frame 40 is a film 41 of suitable thin transparent or light pervious material colored to correspond to the third separation color, as for example blue. The color intensity or shading of the film 41 increases gradually downwardly, so that the lighter blue is at the top.

Figure 11:
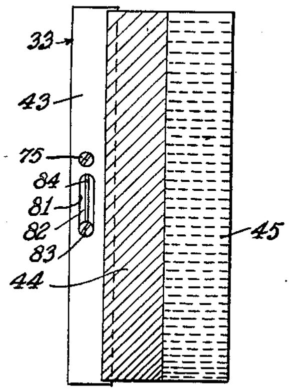
Fig. 11 is a face view of the combined grey and brown color slide constituting part of the gauge.

Slide 33 (Fig. 11) comprises a frame 43 shown in the form of a solid rectangular metal sheet, smaller in width than the slide frame 40, but substantially of the same height. Attached to the side of this frame 43 is a film of suitable thin light pervious material having a brown area 44 and a grey area 45, both increasing gradually in color intensity or shading, so that the lighter shades are at the top. The two areas 44 and 45 may be formed on the same film or may be made separately and secured together edge to edge.

The films 35, 37, 41, 44 and 45 are mounted in the housing 10 in registry one behind the other in line with the window 20, so as to come to view through said window when said films are raised in a manner to be described.

For locating the four slides 30, 31, 32 and 33 in proper position in the housing 10 and for guiding them in their sliding movement, there are provided three guides 50, 51 and 52 in the form of parallel sheets extending substantially along the full length of the front panel 11 and spaced from each other and from the panels 11 and 16 to define four guide spaces 53, 54, 55 and 56. The guides 50, 51 and 52 are secured along one side to bar rails 57, 58 and 59 respectively, which in turn are affixed to the inner face of the front panel 11 and are of progressively varying width but with their edges on the other side in registry and spaced from the side housing wall 13, to define between the two panels 11 and 16 a space 60, in which the films 35, 37, 41, 44 and 45 may slide behind the window 20.

The widest slide 30 is guided in the space 53 between the guide 50 and the rear panel 16 and has the outer edge of its frame 34 slidably engaging the side housing wall 12 and the outer edge of its yellow color film 35 extending with a free sliding fit in a guide groove 61 in the side housing wall 13.

The next slide 31 has its frame 36 slidably retained in the guide space 54 between the guides 50 and 51, with the outer edge of said frame slidably engaging the rail 57 and the outer edge of its red film 37 extending with a free slide fit in a guide groove 62 in the side housing wall 13.

The slide 32 has its frame 40 slidably retained in the guide space 55 between the guides 51 and 52 with the outer edge of said frame slidably engaging the rail 58 and the outer edge of its blue film 41 extending with a free slide fit in a guide groove 63 in the side housing wall 13.

The fourth slide 33 has its frame 43 slidably retained in the guide space 56 between the guide 52 and the front panel 11 with the outer edge of said frame slidably engaging the rail 59 and the outer edge of its film 45 extending with a free slide fit in a guide groove 64 in the side housing wall 13.

In lowermost position of the slides 30, 31, 32 and 33 shown, the tops of these slides extend substantially level with the bottom edges of the panel openings 20 and 25 and out of view. These slides may be raised, to bring any one of the films 35, 37, 41, 44 and 45 into view behind the window opening 20. To permit manipulation of these slides into selective position described, there are provided finger buttons 70, 71, 72 and 73 having their shanks extending through the guide slots 21, 22, 23 and 24 respectively and secured to the slide frames 34, 36, 40 and 43 respectively through respective screws 75. The buttons 70, 71 and 72 may be colored yellow, red and blue respectively to correspond to the colors of the films 35, 37 and 41 associated therewith and the button 73 may be colored black or brown to correspond to the color of the film 44 or 45 associated therewith.

To releasably hold the slide 30 in any selected slide position, the back panel 16 has secured thereto a flat strip 78 having a series of holes 80 located along the guide slot 21 and spaced according to the spacings of the graduations on the scales 26 and 27. A recess 81 in the frame 34 of the slide 30 has a spring 82 in the form of a wire or leaf retained therein at one end by a screw 83 and having a latch conformation 84 at its other end adapted to snap into any one of the holes 80 when it comes opposite said hole and to be cammed out of said hole and thereby released therefrom when the slide 30 is forcibly moved through manipulation of its button 70 along the guide slot 21. The holes 80 are located to engage the latch conformation on the spring 82, when the button 70 comes opposite a graduation on the scale 26 or 27.

A slat or bar 85 secured to the slide frame 34 and filling the space between said frame and the front panel 11 serves to maintain the spring 82 yieldably pressed against the slide holding strip 78.

To releasably hold the other slides 31, 32 and 33 in any selected slide position, each of the guides 50, 51 and 52 is provided with a row of holes 87 located along the corresponding guide slots 22, 23 and 24, and arranged with respect to the graduations on the scales 26 and 27, as in the case of the holes 80 on the slide holding strip 78. Each of the slide frames 36, 40 and 43 is provided with a spring device similar to that described in connection with the slide frame 34 to effect releasable latch engagement of said frames with the holes 87.

The slide frames 31 and 32 have secured thereto slats or bars 88 and 89 respectively to fill the spaces between said frames and the front panel 11 and to maintain the spring associated with these frames yieldably pressed against the guides 50 and 51, while the slide 33 does not need such a slat because of the proximity of its associated guide 52 to the front panel 11.

The junction between the brown and grey film areas 44 and 45 is in line substantially with the vertical center line of the window opening 20, and the combined width of these areas is at least coextensive with the width of said opening. The window opening 20 has a shutter 90 about half the width of said opening and slidable to expose either half of said opening and to expose thereby either the brown area 44 or the grey area 45 therethrough. The other films 35, 37 and 41 extend at least the full width of the window opening 20 and, therefore, overlap both the brown and the grey areas 44 and 45.

Registering holes 92 in the three guides 50, 51 and 52 serve as a means by which these guides may be aligned in proper relative position and as a means by which the screws for mounting the finger buttons 71, 72 and 73 may be inserted in position or taken out.

The shading of the various films varies from that corresponding to a solid color at the bottom, designated 100 on the "positive" scale 27, to a minimum or zero intensity at the top. The scale 27 represents the intensity at the various areas with respect to the maximum intensity (100). The "negative" scale 26 carries numbers which represent the shade of the negative corresponding to the respective shades of the positive. Hence the negative scale 26 is numbered inversely as the positive scale 27.

The calibration of the scales and the shading of the films is such that when one of the films 35, 37, 41 or 44 is moved by manipulation of the corresponding finger button to reveal any selected shade through the window opening 20, the setting of this button on the scale 27 will correspond to the setting which must be applied to the button 73 controlling the grey film 45, to reveal through the window opening 20 the correct shade of grey which the color separation positive should have for making a printing plate which will accurately reproduce the designated color. The button 73 may be set to the corresponding number on the scale 26 to show in the opening 20 the corresponding shade of the separation negative. The corresponding photographic color separation positive or negative is then retouched, if necessary, to agree with or match the grey shade thus exposed through the window opening 20.

In order to analyze a color for three or four color printing, the different buttons 70, 71, 72 and 73 may be set along their respective guide slots until the required color composition is produced and displayed through the window opening 20. The setting of these buttons 70, 71, 72 and 73 on the scale 27 is then noted and the buttons returned to their lowermost position. The button 73 is then moved along the guide slot 24 into the different indicated positions on the scale 26 to disclose the correct corresponding shades of grey for the respective color separation negatives. The negatives are then retouched if necessary, positives are made therefrom and the positives are checked against the shades of grey shown by setting the button 73 at the designated number on the scale 27. The positive may then be retouched if necessary and when made to match the indicated shade of gray will be suited for the making of the corresponding printing plate.

Obviously the device may be used to analyze colors for various purposes. A specific use has been set forth for purposes of illustration only.

What is claimed is:

1. A color gauge for use as a retouching guide in connection with color printing, comprising a housing having front and back panels and side walls, registering window openings in said front and back panels adjacent one of said side walls, said front panel having a plurality of vertical slots therein and progressively spaced between said window openings and the second of said side walls, a fixed guide member carried by said front panel between each pair of said slots and forming therebetween a series of progressively displaced parallel channels a flat rigid guide member carried by each of said first guide members, said flat guide members being successively spaced between said front and back panels to form a series of spaced parallel channels and terminating in advance of said window openings, a set of rigid supports mounted to slide in said first channels, actuating members carried by said supports and extending through the respective vertical slots for independent actuation of each support, said supports including rigid slides slidable in said parallel channels between said flat rigid guide members, and a transparent film carried by each slide for sliding movement into display position between said front and back window openings, said films being mutually spaced in overlapping position by said rigid slides said films being of different colors and each film varying in shade from top to bottom, said films being slidable with said supports to bring selected color areas thereof into overlapping registration with said window openings whereby a selected color can be composed by relative adjustment of the various supports, all of said films having identical shade values and variations from top to bottom whereby shade values can be determined and transposed from one color to another by making identical adjustments of the respective films.

2. A color gauge, as set forth in claim 1, in which one of said films carries parallel areas having shades of grey and brown respectively and both disposed to be visible through said window openings.

3. A color gauge, as set forth in claim 2, in which said front panel carries a shield adjustably mounted to expose either the grey area or the brown area only of said film through said window opening.

GUIDO MATTUCCI.

REFERENCES CITED

The following references are of record in the file of this patent:

UNITED STATES PATENTS

| Number | Name | Date |
|---|---|---|
| 1,496,374 | Jones | June 3, 1924 |
| 2,120,499 | Mackay | June 14, 1938 |
| 2,196,271 | Olson | Apr. 9, 1940 |
| 2,234,278 | Richter | Mar. 11, 1941 |
| 2,253,231 | Friedell | Aug. 19, 1941 |